United States Patent [19]

Schaetzle

[11] Patent Number: 4,459,814

[45] Date of Patent: Jul. 17, 1984

[54] THERMAL ENERGY COMPRESSION SYSTEM FOR HEAT PUMPS

[76] Inventor: Walter J. Schaetzle, 9 Oak Bluff, Northport, Ala. 35476

[21] Appl. No.: 317,192

[22] Filed: Nov. 2, 1981

[51] Int. Cl.$^3$ .................................................. F25B 7/00
[52] U.S. Cl. ........................................ 62/175; 62/332; 62/476; 62/238.3
[58] Field of Search ...................... 62/143, 149, 235.1, 62/476, 338.3, 175, 332, 333, 334; 165/62, 141

[56] References Cited

U.S. PATENT DOCUMENTS

| | | | |
|---|---|---|---|
| 2,455,401 | 12/1948 | Brause | 62/5 |
| 2,597,779 | 5/1952 | Coons | 62/6 |
| 2,951,350 | 9/1960 | Etherington et al. | 62/149 |
| 3,828,566 | 8/1974 | Wetzel | 62/143 |
| 4,121,432 | 10/1978 | Well et al. | 62/79 |

Primary Examiner—Albert J. Makay
Assistant Examiner—Henry Bennett
Attorney, Agent, or Firm—Oblon, Fisher, Spivak, McClelland & Maier

[57] ABSTRACT

A thermal energy compression system wherein the refrigerant in a heat pump or air-conditioner is compressed by thermal energy in the compression system rather than by work in a standard compressor. The compression uses an intermittent compression process with a solid absorbent. The vapor is absorbed by an absorbent at relatively low temperature and ejected as the absorbent temperature is raised and a set of one way valves limits flow to one direction so as to improve heat transfer requirements, to allow for molecular sieve-refrigerant matching, minimizing non-producing mass, solving thermal fatigue and shock problems, and use of the system in parallel with a standard compressor, automobile air-conditioning applications and truck refrigeration applications.

10 Claims, 13 Drawing Figures

THERMAL ENERGY COMPRESSION SYSTEM FOR HEAT PUMPS

BACKGROUND OF THE INVENTION

1. Field of the Invention

This invention relates to a compression system and, more particularly, a thermal energy compression system for heat pumps.

2. Description of the Prior Art

The input to the standard heat pump cycle (air-conditioning/refrigeration) is work. This work input in the form of engine power or electric motor power requires useful energy normally converted from irreplaceable energy resources. This converted work is required to drive a compressor to raise the refrigerant pressure from the low pressure range to the high pressure range in the heat pump cycle. This work input comprises a large majority of the energy input into the heat pump (air-conditioning/refrigeration system). Other system components such as controls and blowers use appreciably less work. A system which effectively uses low grade thermal energy or waste heat to replace the compressor work input is a major advance in the refrigeration field.

The major cost of the standard compression equipment consists of the driver (motor) and compressor, both moving parts. These components also have the highest failure rate. A system which basically has no moving parts and is much simpler is a major advance in the refrigeration field.

This system uses an intermittent absorption type compression process with a getter or absorbent to provide the compression. Most literature in this area uses silica-gel as an example for the compression process. The principle behind the compression has been previously patented. A solid absorbent such as silica-gel will absorb refrigerants and even water at a relatively low temperature and then regenerate by driving off the refrigerants at a relatively high temperature. It must be noted that a silica-gel system is economically questionable. A system of one way valves allows only one way passage through the container holding the refrigerants. As the absorbent is cooled towards ambient temperature, the refrigerant is absorbed. After the refrigerant is absorbed, the system is heated and the refrigerant is regenerated. By adding and removing thermal energy in a cyclic sequence, the refrigerant is compressed using only thermal energy. Many proposed applications are very lacking in the heat transfer, thermal mass, energy availability, cooling availability, thermal fatigue, thermal shock, and other mechanical aspects for practical application. The compression concept is relatively old, being used in U.S. Pat. Nos. 2,455,401 and 2,597,779 in 1948. Additional variations are given in U.S. Pat. Nos. 4,121,432 and 3,828,566. The last applications have a major application to automobile air-conditioning. Even though the patents are old, no applied applications are in widespread existence, and individual working systems are unknown. Basic requirements to make the system work on a feasible basis technically and economically are missing.

SUMMARY OF THE INVENTION

This invention makes unique utilization of energy sources, uses unique applications of high quality molecular sieve manufacturing applications, uses economical simple configurations for refrigerant compression chambers and controls, uses practical and economical cooling systems for the refrigeration compression process, solves thermal fatigue and shock problems, provides some thermal storage and devises a parallel method of refrigerant compression to standard refrigerant compressor in heat pumps, air-conditioning, bus and truck air-conditioning, truck refrigeration, building heating and cooling, commercial refrigeration systems, and solar heating and cooling. The compression system is devised to be simple, economical, and conveniently installed in present heat pump, air-conditioning and refrigeration systems. The conversion of present heat pump, air-conditioning and refrigeration systems to this compression system is technically convenient in many applications.

Through the new compression system, the converted cycle will replace power, an ideal expensive energy, with low grade thermal energy as the energy input to provide refrigerant cycle compression. Using the compression system in parallel to a standard compressor allows the use of thermal energy for compression when available and the standard compression otherwise. This is particularly useful for a solar application.

Other than the compression system, the refrigeration cycles are not altered. The identical components including evaporator, condenser, throttling valve, etc. and the identical refrigerant can be utilized. This makes present heat pump (air-conditioning and refrigeration) systems convenient to convert to the new compression system.

By shutting off the refrigerant lines to the absorption chamber, a residual quantity of thermal (cooling) storage can be made available. This allows immediate cooling upon start-up, for example, an automobile air-conditioning system.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
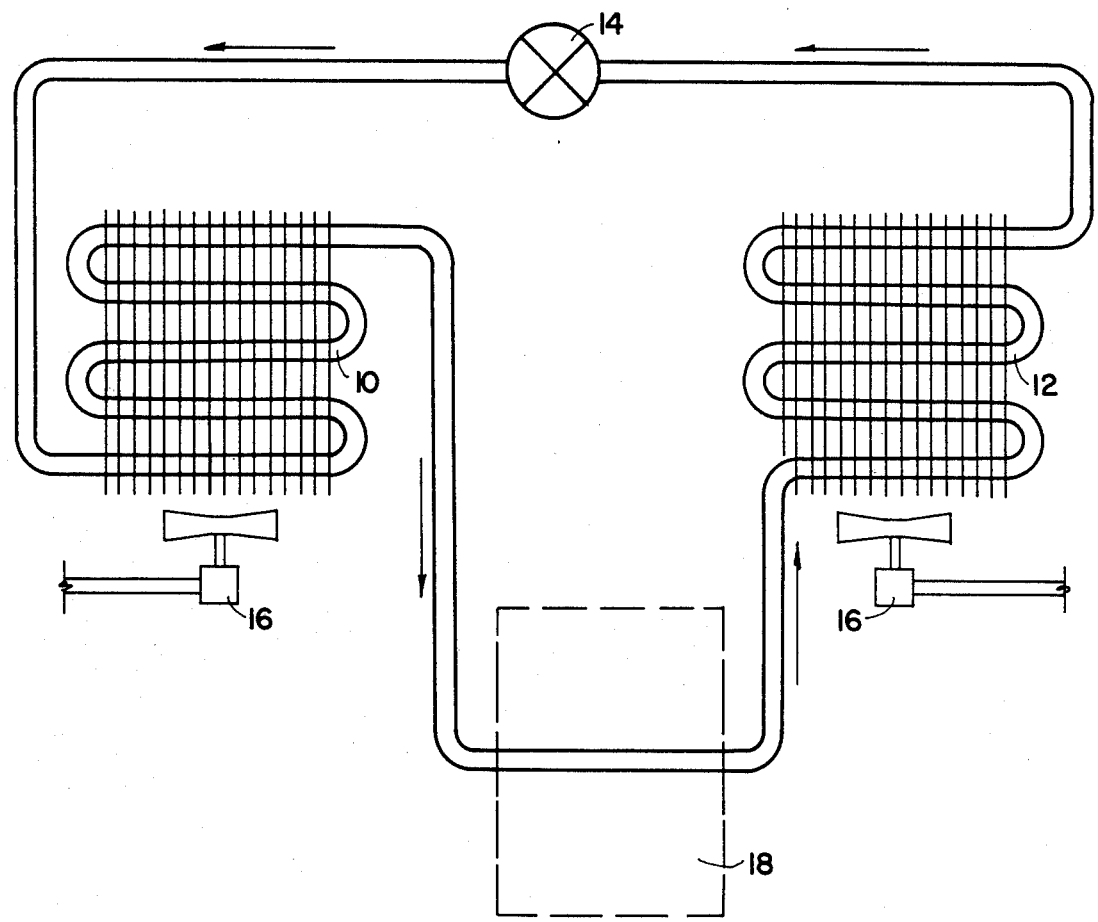
FIG. 1 is a diagram of a basic conventional heat pump (air-conditioning or refrigeration) cycle showing the location of the compression system.

FIG. 1 shows the basic components of the standard liquid-vapor heat pump (air-conditioning) cycle. The refrigerant vapor is compressed by the compression system 18. This compression system 18 can be either the standard compressor presently used in heat pumps (air-conditioners) or the unique compression system disclosed in this patent application. In system 18 is the location of the compression system of the present invention. The new compression system is defined in the following figures. In FIG. 1 the refrigerant leaves the compressor and enters the condenser 12 where energy is removed and the vapor liquifies. If the purpose of the cycle is heating, the energy given off by the refrigerant at this location provides the heating and the system is in the heat pump mode. The liquid leaves the condenser and passes through a throttling valve 14 to the evaporator 10. In the evaporator 10, the refrigerant absorbs energy and provides cooling. This mode provides the air-conditioning and refrigeration utilization of the cycle. This cycle is the standard liquid-vapor heat pump cycle. This cycle does not change with the addition of the new compression system. The controls for the new system are basically identical, however, a few control changes are possible. One such change could be a refrigerant capacitance system to smooth the intermittent flow.

Figure 2:
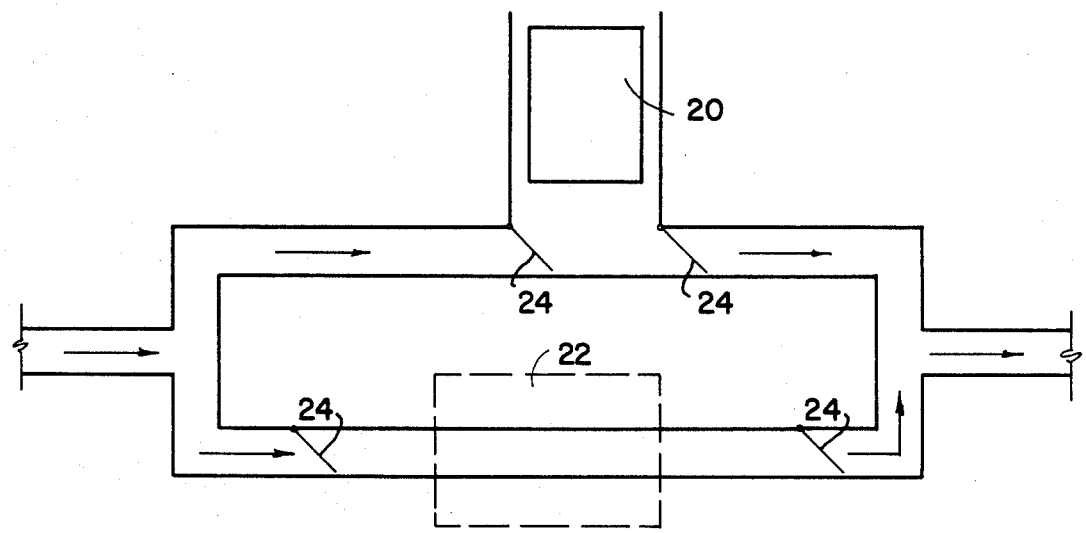
FIG. 2 is a diagram showing a standard compressor in parallel with the compression system of the present invention.

As shown in FIG. 2, the new compression system 22 can be used independently or in parallel with a conventional compressor 20. In this case, the new compression system 22 and the standard compressor 20 comprises the total compression system 18. By using the new compression system 22 in parallel with a standard compressor 20, the system can be used when thermal energy is available part of the time but not continuously. A prime example is a solar energy air-conditioning system. When solar energy is available the compression system 22 is utilized and when solar energy is not available the standard compressor 20 is utilized. The addition of the new system to a standard heat pump or air-conditioner is simple and refrigerant flow can be easily controlled with a sequence of one way valve 24 as shown in FIG. 2. An active control system with positive on-off valves can be utilized to replace the one way valves 24. Parallel compression applications are many. Industrial applications where waste thermal energy is available part time is a prime application. In supermarkets waste heat from refrigeration compressors can be used directly for heating in winter periods and used for air-conditioning during summer periods. Parallel applications are numerous and can be applied with small or large reciprocating, centrifugal, or screw type compressors.

Figure 3:
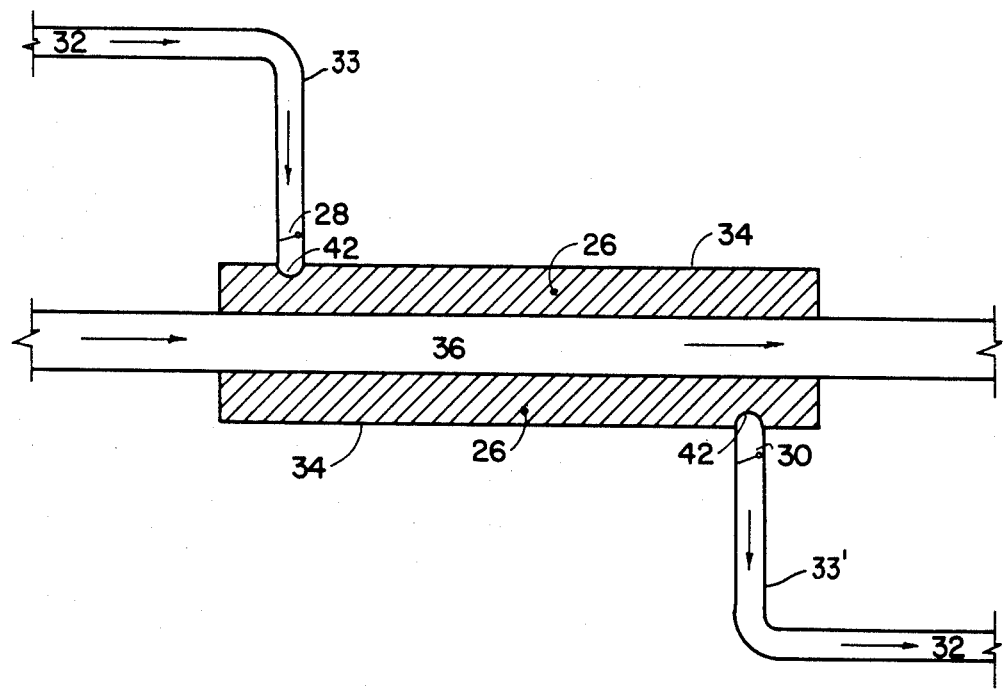
FIG. 3 is a diagram showing a schematic of the compression element (a cross-section along the compression element) indicating the refrigerant flow path and the operation of the one way valves.

FIG. 3 shows the basic element schematic configuration for the refrigerant flow and the heating and cooling flow. A molecular sieve 26 is shown which absorbs refrigerant at relatively low temperature via passage 33. The traditional example is silica-gel crystals absorbing water vapor. At relatively low temperatures, silica-gel absorbs water vapor until the vapor pressure is extremely low. When the crystals are heated to a relatively high temperature, in an oven for example, the water vapor is forced out of the pores and exits at a relatively high pressure via passage 33'. In this case, refrigerants are absorbed by molecular sieves at relatively low temperatures, for example 100° F. to 200° F., and rejected at relatively high temperatures, for example 150° F. to 400° F. A sealed container 34 with inlet check valve 28 and outlet check valve 30 holds the molecular sieve 26 and refrigerant. A flow passage 36 allows hot or cold fluids to transfer heat from and to the container 34. By using a system of check valves 28, 30 the refrigerant flow 32 is allowed to flow in only one direction. As cooling occurs the temperature decreases, the molecular sieve 26 absorbs refrigerant 32 and produces flow into the low pressure area in container 34. Due to the low pressure in container 34 the outlet check valve 30 closes and prevents reverse flow. When the compression system and molecular sieve 26 is heated the absorbed refrigerant 32 is rejected, the pressure increases, inlet check valve 28 closes, the outlet check valve 30 opens, and the refrigerant flows from the container at a higher pressure. The system with the molecular sieve 26 performs as a compressor to compress the refrigerant 32. A relatively warm fluid and a relatively cold fluid must flow intermittently past the container 34 through passage 36 to alternate the heating and cooling of the molecular sieve. No fixed shape is required for the container 34 and the inlet valve 28 and outlet valve 30 can be essentially at any location. Screens 42 are provided at the inlet valve 28 and outlet valve 30 to contain the particles of the molecular sieve 26. The molecular sieve 26 may be a powder, small spheres or small cylinders. These sizes usually vary from 1/16 inch to ¼ inch diameters. Other configurations are possible.

The critical requirements to make the compression system work economically are the matching of the molecular sieve 26 and refrigerant 32, minimizing system mass, providing an adequate heat transfer system and designing for thermal fatigue and shock.

The molecular sieve 26 must be dense and absorb a relatively high mass of refrigerant 32 per unit mass of the molecular sieve 26. The pore size of the molecular sieve 26 must be matched to the molecule size of the refrigerant 32. Meeting these requirements minimizes molecular sieve mass and volume. A small molecular sieve volume decreases heat transfer lengths and resistance and minimizes container size and mass. It maximizes refrigerant mass absorbed per unit of molecular sieve mass and per unit of container mass. For example, ordinary silica-gel will not be an economical absorbent for refrigerants. Designing the compression system with the proper molecular sieve is a system requirement. The energy required to heat and cool the molecular sieve mass and container mass is lost. Only the energy removal for absorbing the refrigerant and the energy for regenerating the refrigerant are useful. The thermal energy into the system must be fully utilized. For example, the available energy for automobile air-conditioning or truck refrigeration systems using exhaust gases at idle is critical. If one of these systems fails to use most of the available energy there will not be sufficient energy to provide the required cooling or refrigeration. Using the vehicle exhaust after passage through a catalytic converter helps both in energy quantity and quality (higher temperatures for heat transfer purposes).

The second critical requirement is to provide sufficient heat transfer for both heating and cooling in a reasonable amount of time. Cycling a compression unit every thirty minutes will not be economically feasible in most cases. To provide sufficient refrigerant flow rate for a reasonable sized compression unit, rapid cycling is required. The non-molecular sieve mass and container mass must be minimized. Heating and cooling this mass uses non-productive energy and slows heatng and cooling. This means less cycles per unit of time which results in an even larger system. Heating and cooling castings is normally not feasible (castings usually contain a relatively large mass). Every component must be light weight. Thin wall tubing is essentially required. The circular form is required for high pressures within thin walls to meet pressure requirements. Non-contributing mass must be minimized for technical and economic feasibility.

In the thermal cycling the system is alternately heated and cooled. In the thermal switching process, thermal shock occurs. The change of temperatures causes changes in component size. As a result, thermal stresses occur. These components must be designed so that large stresses do not occur. The tubes in the compression system must be flexible so that as they heat and cool no large stresses occur. For example, placing a U-turn member in the tubes will allow expansion and contraction. Making end plates on the end of cylinders conical rather than flat will produce slight movements rather than stresses as the piece is heated and cooled. The thermal stresses have been a major problem in the testing of prototype systems. The heat transfer requirements are discussed hereinbelow in connection with the next two figures. The failure to specify proper molecular sieve-refrigerant combinations, the limiting mass requirements, the design for thermal fatigue and shock, and the critical heat transfer requirements has probably caused the economic and technical failure of past patent application design in the solid intermittent absorption heat pump systems.

Figure 4:
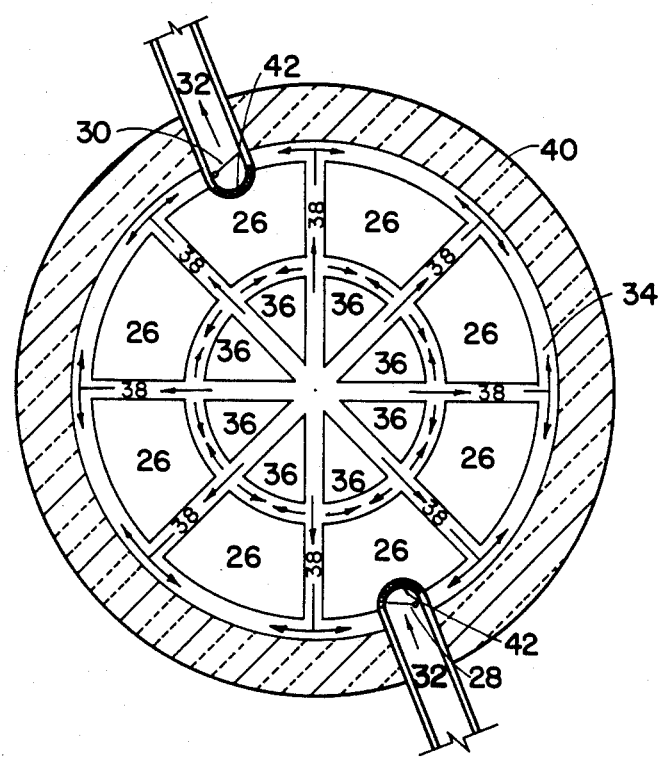
FIG. 4 is a diagram showing a cross-section across a typical compression element indicating the refrigerant flow and heat transfer flow.
Figure 5:
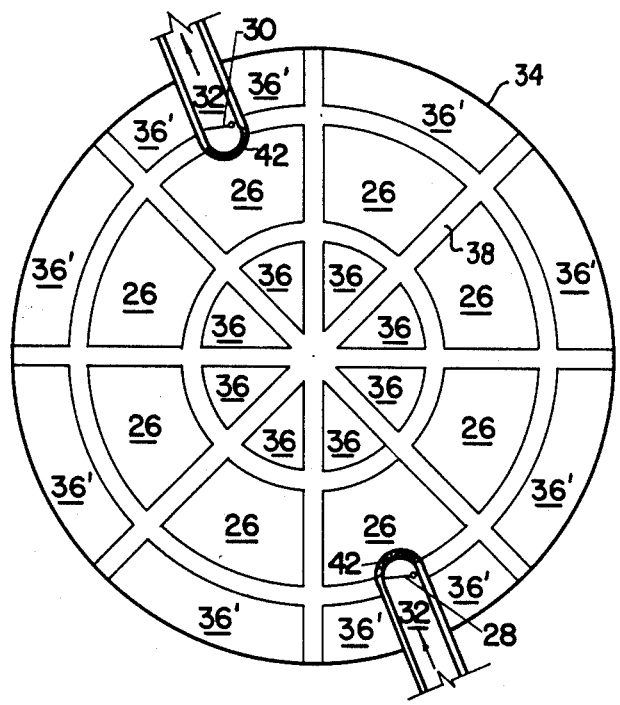
FIG. 5 is a diagram showing additional heat flow path possibilities.

FIGS. 4 and 5 show schematic diagrams of a number of possible heat flow patterns. By extending the fins 38 (conduction paths) into the flow passages 36, the heat transfer area between the fluid and solid is increased. The continuation of the fins 38 through and behind the packed molecular sieve 26 provides additional conduction paths for the heat transfer. The volume of molecular sieve 26 is minimized to minimize the length of the conduction path. Heat transfer area is maximized and conduction path length is minimized. Construction of the system with a good conducting material adds to high heat transfer rates. Some trade-off is required to minimize non-molecular sieve mass. The refrigerant flow 32 to the molecular sieve 26 is controlled by one way valves (inlet 28 and outlet 30) as described earlier. The ends of the inlet and outlet 28, 30 are correspondingly provided with screens 42 to contain the molecular sieve material 26.

FIG. 4 also shows a system were the fluid flow passages 36 only pass through the center of the molecular sieve container 34. In this case the fluid in flow passages 36 has to alternate between hot and cold. This heats and cools the molecular sieve material 26. Normally the outside of the system would be insulated 40. Conduction paths 38 shown by arrows lead to both sides of the molecular sieve 26 to maximize heat transfer. FIG. 5 shows a schematic diagram with flow passages 36, 36' on both sides of the molecular sieve 26. This allows hot and cold fluid passages 36, 36' on both sides of the molecular sieve 26 to increase heat transfer area and minimize the lengths of conduction path 38. Note the fins or conduction paths 38 extend into the outside flow passages 36'. An alternative is for hot fluid in center passage 36 while the outside cold passage 36' is closed. Then the center hot flow passage 36 is closed and cold outside passage 36' allows cold fluid to flow. If the cold flow is at ambient temperature, the insulation 40 shown in FIG. 4 could be eliminated.

Figure 6:
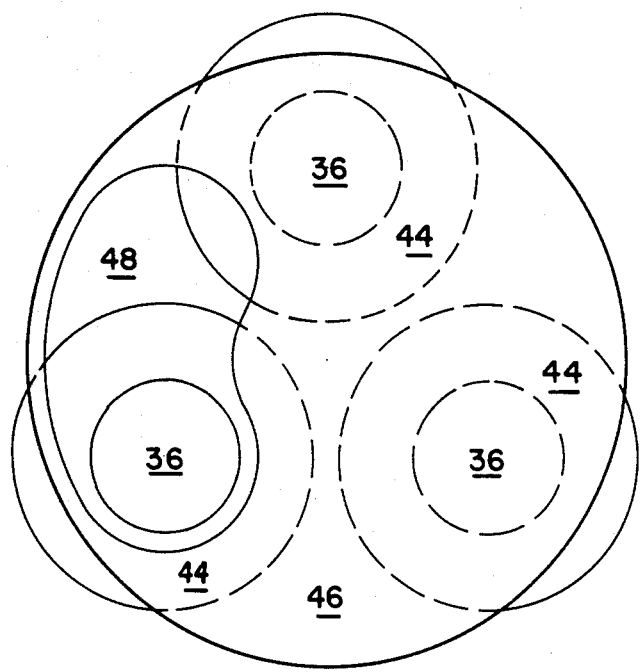
FIG. 6 is a diagram showing three sub-systems assembled in one overall compression system.
Figure 7:
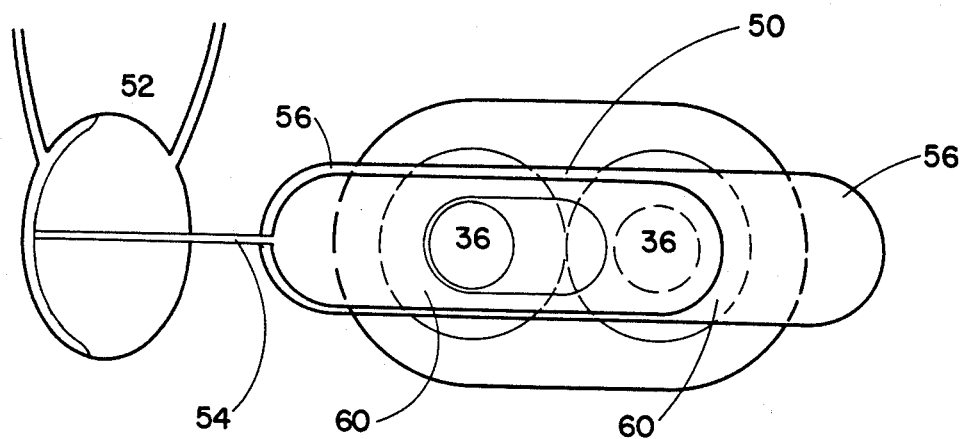
FIG. 7 is a diagram showing the two sub-systems combined into a compression system.
Figure 8:
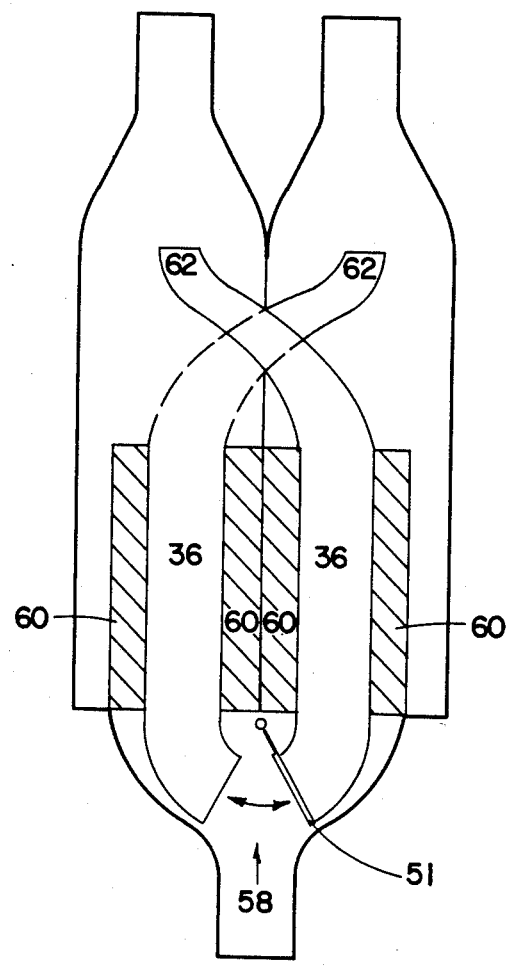
FIG. 8 is a diagram showing a top view of FIG. 7 with hot and cold gas control.

To provide continuous compression, a number of basic systems can form the compression system. FIGS. 6 and 7 show possible groupings of the sub-systems and a basic set of controls to form a total compression system. FIG. 6 shows an end view of three basic sub-systems 44 combined in a circle to form a total compression system. A rotating disk 46 allows fluid access through an opening 48 to one flow passage 36 at a time. The other two systems could be cooling from natural or forced convection over external fins. Since the temperature difference for heating with automobile exhaust is higher than the temperature difference for cooling, the heating requires less time than the cooling. With three compression units 44, one unit can be heating and two units can be cooling. The fins could be enclosed with a secondary positive controlled cold flow. A system of valves could be used to control the cold flow. FIGS. 7 and 8 show two sub-systems side by side with positive control of the heat flow through the center passage. The system could be used for car air-conditioning with exhaust gases passing through the system. A plate 50 moves between the two sub-systems 44 on an impulse from a vacuum solenoid. The plate 50 flips between the sub-systems 44 as the vacuum is oscillated between opposite sides of the solenoid. Cycles of a few minutes are a possible sequence. Hot gas is passed through one or the other sub-system flow passages 36 from the exhaust inlet 58. To maximize input energy from automobile exhaust 58, the gases after the catalytic converter, when available, are utilized. The vacuum solenoid requires essentially zero energy input. Except for the shaft 54 the system input gas path is sealed. On the outlet side, the gas moves through a venturi nozzle 62 to pump cool air over the outer fins on the shut-off system. One sub-system 44 is heated, one sub-system 44 is cooled to provide essentially continuous flow. A system using forced controlled flow over the external fins is a possibility.

Figure 9:
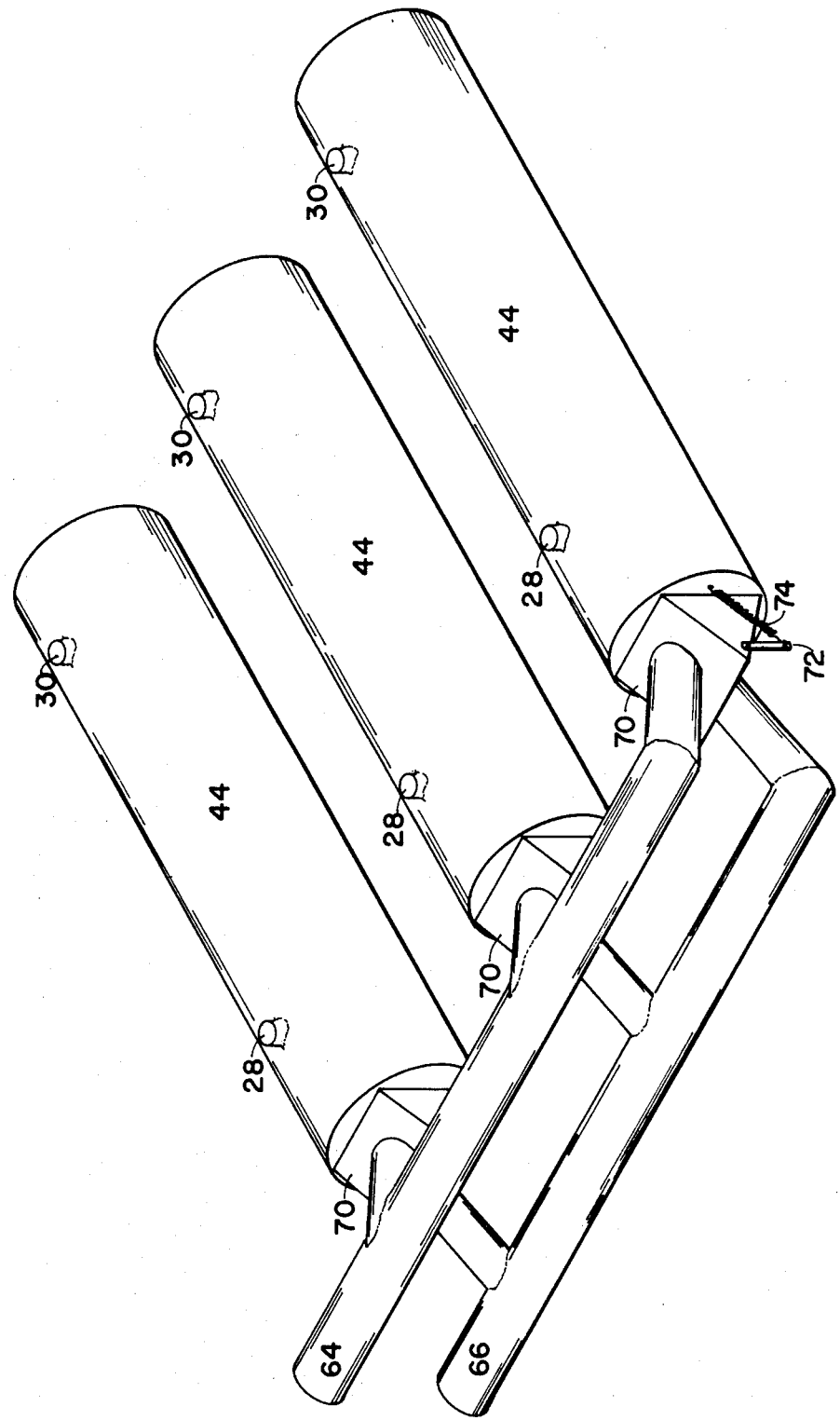
FIG. 9 is a diagram showing three compression sub-systems with control by valves from hot and cool manifolds.

FIG. 9 shows a group of sub-systems 44 combined with a hot fluid manifold 64 and a cool fluid manifold 66. The manifolds 64, 66 enter the end of the compression sub-systems 44 through a fluid switching device 70. The sub-system 44 can be switched from hot fluid to cool fluid by moving lever 72 up and down. The spring 74 keeps the system in either the hot or cool phase. Each sub-system 44 has its own switching device 70. The systems can be controlled by external movement of any kind sequenced in the proper order. For example, one sub-system 44 at a time could be heated for two minutes while the other sub-systems 44 are being cooled. The heating can be moved from one sub-system 44 to another while the other sub-systems 44 are cooled.

Figure 10:
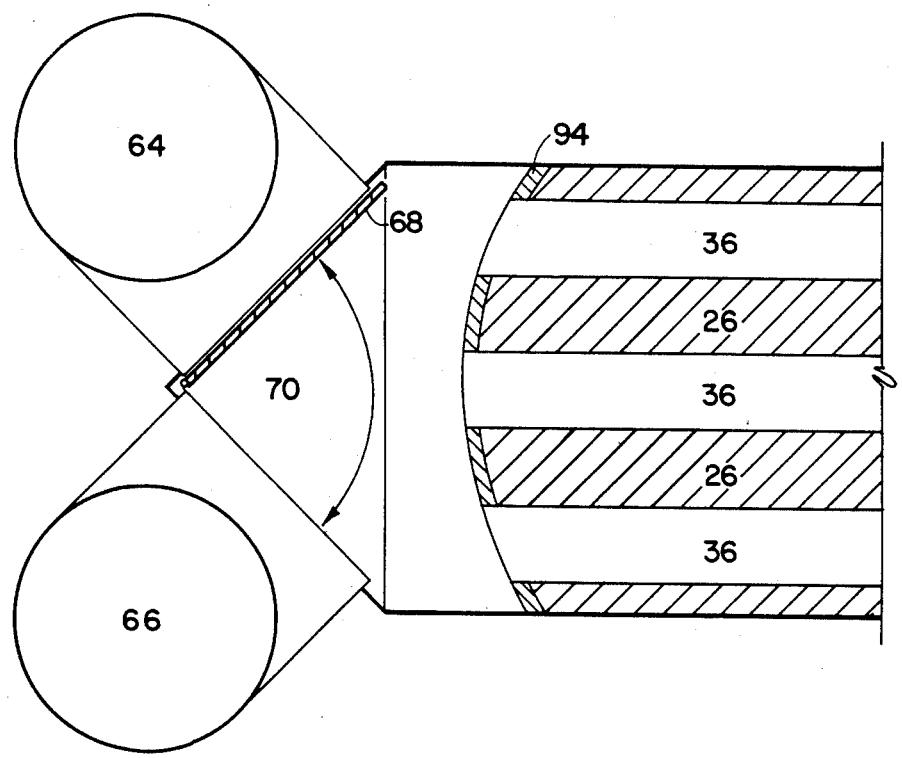
FIG. 10 is a diagram showing a cross-section of the valving system in FIG. 9.

FIG. 10 shows a cross section of the switching device 70 and the end of sub-system 44. The switching device 70 has a valve 68 which either closes the hot manifold 64 or cool manifold 66. Only one manifold or the other can be closed at any given time.

Figure 11:
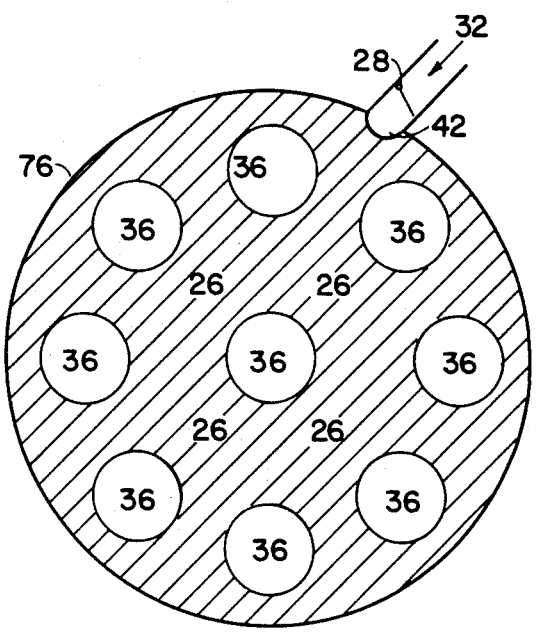
FIG. 11 is a diagram showing a cross-section of a possible compression sub-system of FIGS. 9 and 10.

FIG. 11 is an alternate cross section of a sub-system 44. The molecular sieve 26 is encased in a thin walled tube 76. The heat transfer is accomplished by providing numerous flow passages 36 for hot or cool fluid. The numerous passages minimize the thermal conduction path lengths and maximize the area for convection heat transfer. By using all thin wall tubing 76, the non-productive mass which must be heated and cooled is minimized. The configuration is an alternative to the cooling paths in FIGS. 4 and 5. The plate 94 must be made conically to eliminate thermal fatigue. The tubes 36 must be curved in the container to prevent large thermal stresses.

Figure 12:
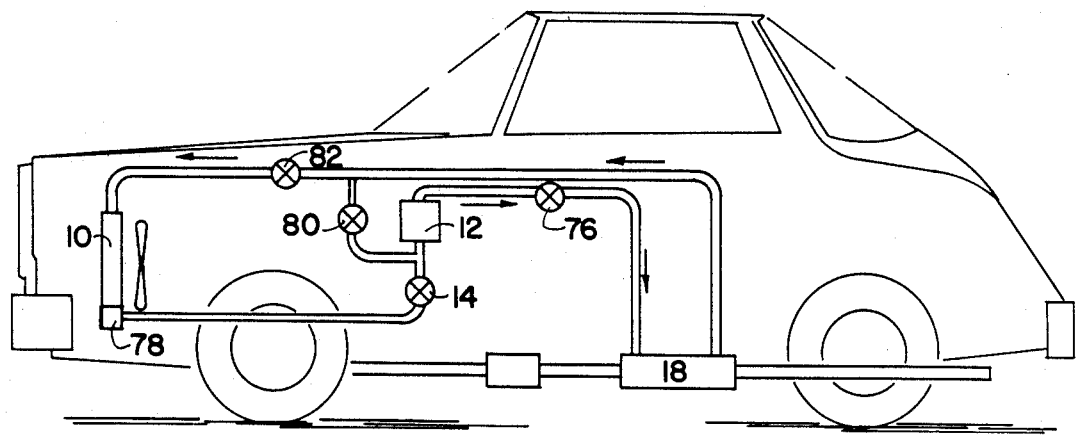
FIG. 12 is a diagram showing an application of the present invention to an automobile.

FIG. 12 shows a schematic of the system in an automobile. The condenser 12 is still in front of the radiator and the evaporator 10 is still located behind the engine at the front of the passenger compartment. Except for the compressor the system is identical. The compression system 18 behind the catalytic converter could be similar to the systems in FIGS. 6 to 11. It must be noted that the standard compressor has been eliminated.

An additional possibility is to provide cold storage when the system is off. By closing valve 76 when the air-conditioner is off, the intermittent compression system 18 will cool and be ready to absorb refrigerant instantly as the air-conditioner is started. As a result, instant response to air-conditioner will result upon turning the system on. Air-conditioning is available before the engine is started. In addition to valve 76, a small liquid refrigerant reservoir 78 is a requirement. Reservoir 78 is required to hold the liquid refrigerant which is normally absorbed by the molecular sieve material. Longer period and larger quantity cold thermal storage, using the same technique, is possible in larger systems using this compression technique. Sufficient absorbent capacity and sufficient liquid refrigerant storage must be available.

Internal automobile heating using the system is a possibility. By opening valve 80 and closing valve 82 the hot refrigerant vapor moves directly from the compression system 18 to the evaporator 12 (used as a heat exchanger) and thereby heats the automobile. The response time to heat output when starting a cold car will be much faster with this system using exhaust gas thermal energy than when using engine water. The exhaust gases are hot immediately while the water system temperature lags. This also eliminates the second heat exchanger used for heating in the automobile environmental control system and thereby helps automobile capital economics.

Mounting a refrigeration unit using this compression system 18 and the exhaust gases on a refrigeration truck is a feasible application. Normal truck exhaust gases, especially on a diesel, are at a higher temperature and much more consistent than the exhaust gases from an automobile. This is probably the simplist application from a technical standpoint. For periods when exhaust gases are not available, a plain burner in the exhaust line can provide the thermal energy. An alternative, FIG. 2, is to use a standard type compressor 20 in parallel with the compression system 22 during these periods. The new refrigeration system is more economical from a capital and operating standpoint than the present refrigeration system using a small diesel engine.

Figure 13:
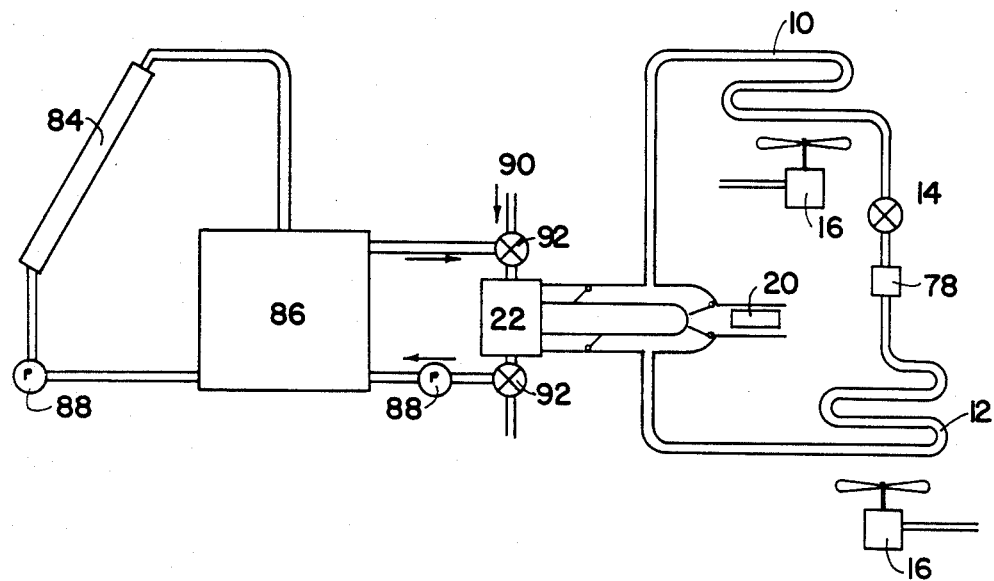
FIG. 13 is a diagram showing a solar application of the present invention with parallel compression.

FIG. 13 shows a schematic of a solar air-conditioning system with parallel compression systems. The solar collector 84 collects thermal energy which is stored in storage 86 until required. Hot water is pumped by pump 88 from storage 86 to the compression system 18 for heating the molecular sieve. Alternately cold water 90 is transferred through the compression system 18 for cooling the molecular sieve. The hot and cold water flow is controlled by valves 92. A standard home air-conditioner (components 10, 12, 16, 20) has been modified to allow the compression system 22 to work in parallel with the standard compressor 20. The refrigerant, heat exchangers, controls, etc. in the air-conditioner are identical to a standard air-conditioning unit. A compression system 22 has been added to allow the use of solar thermal energy when available. When thermal energy is not available, the standard compressor is utilized. This allows solar systems which were used just for heating to be used also for cooling with a minor change in the air-conditioner. This parallel compression process has applications any place where thermal energy is available part of the time and the process is not limited to a solar application.

To summarize, a unique thermal compression system is added to standard liquid-vapor heat pump (air-conditioning/refrigeration) to allow thermal energy use rather than power. In addition to direct applications, the compression system can be used in parallel with a standard compressor. The patent application emphasizes the molecular sieve-refrigerant match, minimum non-producing mass, thermal fatigue and shock, and heat transfer requirements to make the system work technically and economically.

Obviously, numerous modifications and variations of the present invention are possible in light of the above teachings. It is therefore to be understood that within the scope of the appended claims, the invention may be prescribed otherwise than as specifically described herein.

What is claimed as new and desired to be secured by Letters Patent of the United States is:

1. An intermittent compression unit for use in a refrigeration system utilizing a refrigerant, comprising:
   a fluid passage means;
   first compressor means in communication with said fluid passage means;
   second compressor means operatively associated with said first compressor means and said fluid passage means and which further comprises a container having an inlet and an outlet and having a first and second flow passage formed therein;
   sieve means disposed in said container;
   passage means operatively associated with said container for communicating said refrigerant to said inlet and from said outlet of said container;
   check valve means mounted in said passage means for controlling said communication of refrigerant into and out of said sieve via said inlet and outlet, respectively;
   means for selectively controlling communication of said fluid passage to said first or second compressor; and
   means for selectively controlling flow of fluid from said fluid passage means to said first or second flow passage in said container.

2. A compression unit as set forth in claim 1, further comprising screen means provided in said inlet and said outlet for containing particles of said sieve means within said container.

3. A compression unit as set forth in claim 2, wherein said sieve means further comprises a molecular sieve.

4. A compression unit as set forth in claim 1, wherein said sieve means further comprises a molecular sieve.

5. A compression unit as set forth in claim 1, wherein said means for selectively controlling flow of fluid from said fluid passage means to said first or second flow passage in said container further comprises a rotating disk having an opening formed therein for selectively allowing passage of fluid therethrough.

6. A compression unit as set forth in claim 1, wherein said means for selectively controlling flow of fluid from said fluid passage means to said first or second flow passage further comprises a movable plate.

7. A compression unit as set forth in claim 1, wherein said means for selectively controlling flow of fluid from said fluid passage means to said first or second flow passage further comprises a movable lever.

8. A compression unit as set forth in claim 1, further comprising a plurality of fins radially extending from a position within said at least one passage to a position within said sieve so as to maximize heat transfer.

9. A compression unit as set forth in claim 1, further comprising means for providing cold storage when thermal energy is not available to activate the refrigeration system.

10. An intermittent compression unit as set forth in claim 1, wherein said refrigeration system further comprises an internal heat exchanger for an automobile and further comprising means for internal automobile heating using the intermittent compression unit to circulate hot refrigerant to the internal heat exchanger.

* * * * *